United States Patent

[11] 3,563,144

| [72] | Inventor | Kunihiro Fukino<br>Tokyo, Japan |
|---|---|---|
| [21] | Appl. No. | 749,483 |
| [22] | Filed | Aug. 1, 1968 |
| [45] | Patented | Feb. 16, 1971 |
| [73] | Assignee | Nippon Kogaku K. K.<br>Tokyo, Japan |
| [32] | Priority | Aug. 23, 1967 |
| [33] | | Japan |
| [31] | | 42/72369 |

[54] PRESSURE PLATE FOR CAMERAS ADAPTABLE FOR FILM WITH OR WITHOUT BACKING PAPER
3 Claims, 7 Drawing Figs.

[52] U.S. Cl. .................................................. 95/11, 352/227
[51] Int. Cl. .......................................... G03b 19/00
[50] Field of Search .......................................... 95/11; 352/227

[56] References Cited
UNITED STATES PATENTS

| 2,753,777 | 7/1956 | Faulhaber et al. ............. | 95/11X |
| 2,931,281 | 4/1960 | Dalton ........................... | 95/11 |
| 3,311,037 | 3/1967 | Winkler et al. ................. | 95/11 |

*Primary Examiner*—John M. Horan
*Assistant Examiner*—Alan Mathews
*Attorney*—Anton J. Wille ABSTRACT: A pressure plate arrangement is provided for a roll film camera accommodating film strips with and without paper backing. A channel is provided between the film guide plate and the film guide surface on the camera body for guiding the film strip past a film exposure frame in the camera body. The clearance in the channel is variable through a selector knob on the exterior of the camera back, a stepped cam arrangement being provided to position the film guide plate relative to the film guide surface.

PATENTED FEB 16 1971    3,563,144

PRESSURE PLATE FOR CAMERAS ADAPTABLE FOR FILM WITH OR WITHOUT BACKING PAPER

This invention relates to a film pressure plate for a roll film camera whereby film with or without backing paper may be used interchangeably.

In a still camera, in order to hold the film in a flat position and also to permit the film to be wound and rewound smoothly, a channel-type film control arrangement is normally used in which a predetermined space is provided between the surfaces of film guide rails in conjunction with the film pressure plate provided on the back cover of the camera.

In order to make the camera of such channel - type film controlling system applicable for both the films with or without backing, the space between the pressure plate and the surface of the film guide rail must be changed by the thickness of the backing paper by at least about 0.1 mm.

In prior systems pressure plates provided with stepped portions corresponding to the thickness of the paper backing have been used but these plates had to be turned over to accommodate a roll film without paper backing. This required an opening of the camera back cover to exchange the film pressure plate.

The object of the present invention is to provide a film pressure plate device which will accommodate roll film with or without paper backing, a selector knob being provided to carry out the changeover, the position of the selector knob indicating the type of roll film loaded into the camera.

In accordance with this invention, a selector knob is provided on the back cover of a camera for changing the clearance of a pressure plate to accommodate roll film which may or not have a paper backing. The film feeding operation is carried out very smoothly when a proper clearance is provided for the particular type film loaded into the camera. In the event the pressure plate is not set for film with paper backing, the resistance to winding the film will be immediately noted and the selector knob turned to provide the necessary clearance without opening the camera cover or making any other adjustments.

The pressure plate arrangement according to the invention includes a pressure plate resiliently mounted on the back cover of the camera, a film guide plate being slidably mounted on the pressure plate. Projections are provided on the film guide plate which coact with projections provided on external guide rails fixed in the camera body. The projections on the guide rails are in essence stepped camming surfaces whereby the clearance provided by the film guide plate and the film guide surface of the camera is adjusted. The film guide plate is movable relative to the pressure plate by the selector knob.

This invention will be described more clearly referring to the illustrative embodiments shown in the attached drawing, in which.

Figure 1:
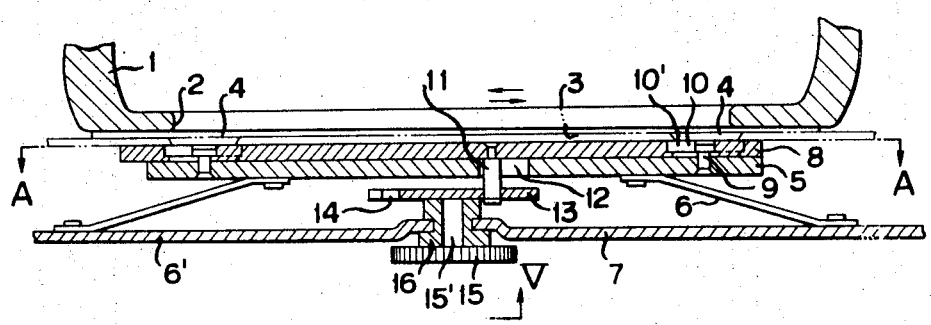
FIG. 1 is the horizontal cross-sectional view of the film pressure plate portion of an embodiment of this invention.

Referring to FIG. 1 of the drawings, the back portion of a camera body 1 is disclosed having a film exposure frame or opening 2 therein and a film guide surface 3. As will hereinafter be described in greater detail, external guide rails 4 are provided on the camera body 1. A film pressure plate 5 secured by way of leaf springs 6 and 6' to the removable back cover 7 of the camera supports a film guide plate 8 which is slidably secured by pins 9 secured in the pressure plate and slots 10 provided in the film guide plate. The film guide plate is thus movable relative to the pressure plate, the slots 10 being recessed as at 10' so that the heads of the pins will not extend beyond the upper surface of the film guide plate. The edges of the film guide plate 8 are provided with projections 8' and are biased against the upper surface of the guide rails 4 due to the resilience of the leaf springs 6 and 6'.

Secured in the film guide plate 8 is a dependent interlocking pin 8 which passes through a groove 12 formed in the pressure plate 5.

The lower end of the interlocking pin is received within an arcuate groove 14 provided in cam plate 13 integral with a selector knob 15 on a shaft 15' rotatably received within an opening 16 provided in the rear cover 7. The selector knob 15 is provided with suitable indicia, herein illustrated as numerals "1" and "2" read against an index mark 7' provided on the back cover to indicate the particular clearance provided.

Figure 3A:
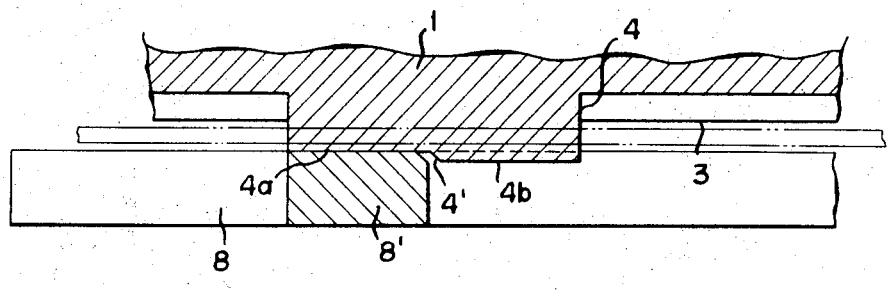
FIG. 3A is an enlarged view of a portion of FIG. 2 on the section line III in FIG. 2 illustrating the pressure plate for film having no backing paper.
Figure 3B:
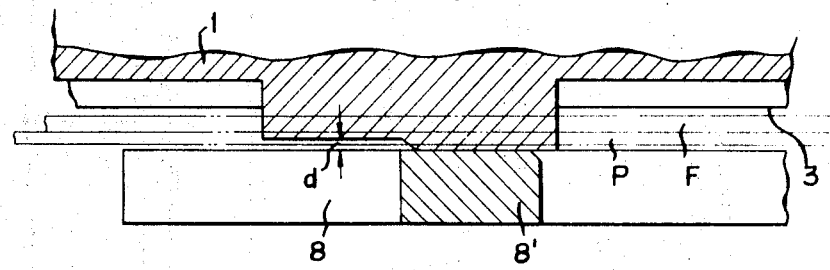
FIG. 3B is a similar view illustrating the pressure plate and film having a backing paper.
Figure 4A:
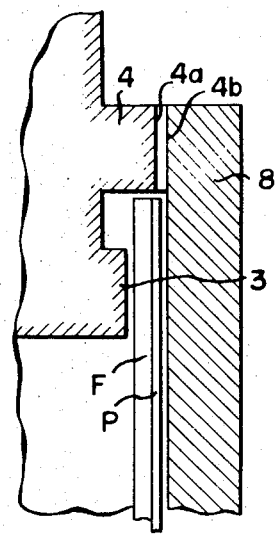
FIG. 4A is an enlarged view along the section IV of FIG. 2 illustrating the pressure plate and film with backing paper.

The external guide rails 4 against which the film guide plate is pressed, are provided with four dependent projections (FIGS. 3A and 3B) adapted to be engaged by the projections 8' of the film guide plate. The projections on the guide rails 4 are each provided with stages or steps 4a and 4b of different heights, the steps being interconnected by a beveled surface 4'. The heights of the steps are so determined that the step 4a with the projection 8' abutting it will provide sufficient space to accommodate the thickness of the film F on the film guide surface 3, (FIGS. 3A, 4B), while 4b will provide the space requirements of the film F and backing paper P (FIGS. 3B, 4A).

Figure 4B:
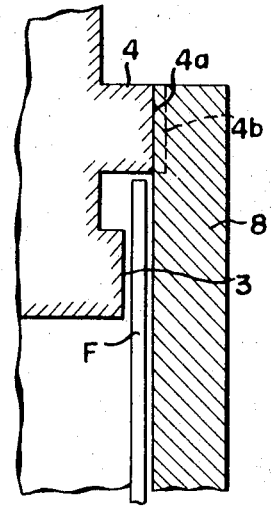
FIG. 4B is a similar view of film without backing paper.
Figure 5:
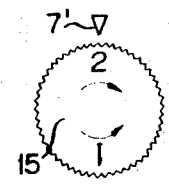
FIG. 5 is a plane view of the selector knob shown in FIG. 1.

In operation of the invention described, the film F is loaded into the camera in the normal way, with the film on the guide surface 3 and the back cover 7 then closed. The projection 8' of the pressure plate 8 will be biased against the lower step 4a of the guide rail due to the bias of the springs 6 and 6'. Clearance as indicated in FIGS. 3A and 4B is provided for the film F so that it may be freely advanced and rewound.

Figure 2:
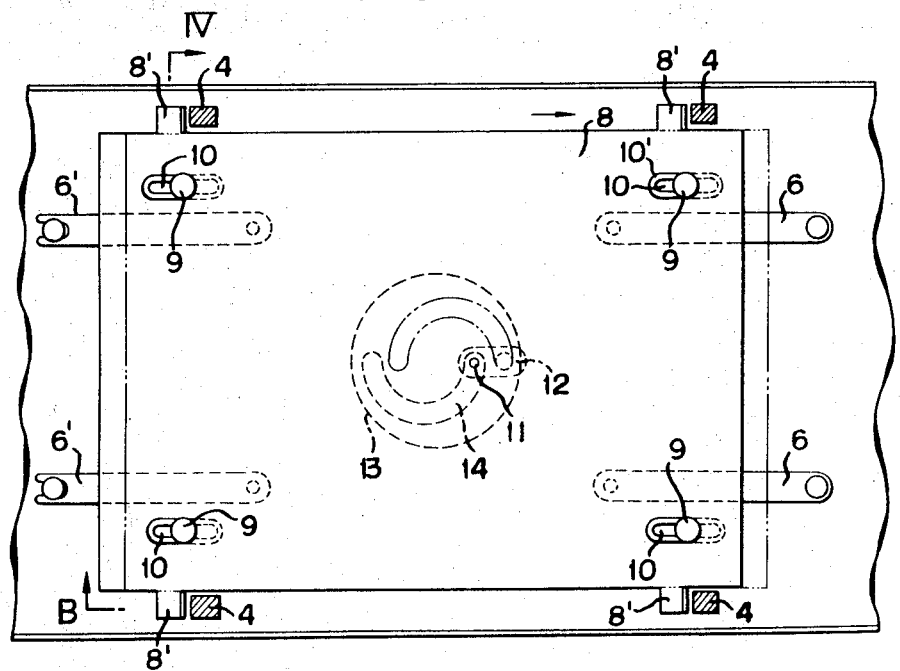
FIG. 2 is the cross-sectional view on line II–II of FIG. 1.

With the projection 8' on the lower step 4a of the guide rail, the cam groove 14 of the cam plate 13 is in the position illustrated by the dashed line in FIG. 2 with the interlocking pin 11 which passes through the slot 12 in the pressure plate, in the full line position. In this position of the interlocking pin, the guide plate 8 is displaced toward the left relative to the pressure plate 5. The selector knob will be in position "2" read against the index 7'.

Should a film roll having a paper backing be used, the selector knob is turned 180° to align the selector knob numeral "1" with the mark 7' thus turning the cam plate 13 to position the cam groove 14 in the double dotted dash line in FIG. 2. Rotation of the cam plate 13 will move the interlocking pin 11 to the right as illustrated by the dashed line in FIG. 2 to slide the film guide plate 8 to the right relative to the pressure plate 5. The projections 8' will then abut the upper steps 4B of the guide rails (FIGS. 3B and 4A) to provide the necessary clearance for the film F and its paper backing P.

It will be apparent from the foregoing description wherein the guide rail projections are formed with steps of varying height, that the upper face of the film guide plate could be provided with a concave portion equal to the thickness of the paper backing for the film. Upon rotation of the selector knob from position "2" to position "2," the guide rail will engage the concave portion as the guide plate is shifted relative to the pressure plate to permit the use of film with backing paper. I claim:

1. A roll film camera adaptable fur using a film strip with and without backing paper, comprising a camera housing including:

a film guide surface on the camera body having an exposure frame therein;

a back cover movable between a closed position and an open position for loading the film strips in the camera;

a pair of guide rails provided on both sides of the path of the film strips on said film guide surface each of said guide rails having two steps in which height of the first step is slightly greater than the thickness of the film strip with backing paper and the second step is lower than said first step by the thickness of the backing paper;

a pressure plate resiliently provided on said back cover to be pressed to said guide rails with the cover in its closed position;

a film guide plate adapted to form a channel between its surface and said film guide surface and slidably movable on the surface of said pressure plate between a first position in which said film guide plate is engaged with said first step and a second position in which said film guide plate is engaged with said second step; and means operable from outside of the camera to selectively move said film guide plate relative to the pressure plate between said first and second position.

2. A roll film camera according to claim 1, wherein said operable means includes:

a knob and a shaft rotatably supported on said back cover;

a camming plate provided between said pressure plate and said back cover and carried by said shaft;

a cam slot in said plate formed in arc;

a slot in said pressure plate; and an interlocking pin fixed to the film guide plate and passing through the pressure plate slot to engage the camming slot in the camming plate for moving the film guide plate relative to the pressure plate upon rotation of said knob.

3. A roll film camera according to claim 2, wherein said knob has two marks to be aligned with an index provided on said back cover so that when one of said marks is aligned with said index, said film guide plate is located in said first position and when the other mark is aligned, said film guide plate is located in said second position.